(12) United States Patent
Boblett et al.

(10) Patent No.: US 9,637,020 B2
(45) Date of Patent: May 2, 2017

(54) LOCATION BASED CHARGING CONTROL OF ELECTRIC VEHICLE

(71) Applicant: Tesla Motors, Inc., Palo Alto, CA (US)

(72) Inventors: Brennan Boblett, San Francisco, CA (US); Nalinichandra Penke, Fremont, CA (US); Miriam Vu, San Francisco, CA (US); Kevin Hsieh, Redwood City, CA (US); Roy Goldman, Cupertino, CA (US); Thorsten Hayer, Burlingame, CA (US); Scott Ira Kohn, Menlo Park, CA (US)

(73) Assignee: Tesla, Inc., Palo Alto, CA (US)

( * ) Notice: Subject to any disclaimer, the term of this patent is extended or adjusted under 35 U.S.C. 154(b) by 699 days.

(21) Appl. No.: 13/899,400

(22) Filed: May 21, 2013

(65) Prior Publication Data

US 2014/0347018 A1 Nov. 27, 2014

(51) Int. Cl.
*B60L 11/18* (2006.01)

(52) U.S. Cl.
CPC ....... *B60L 11/1838* (2013.01); *B60L 11/1816* (2013.01); *B60L 11/1824* (2013.01); *B60L 11/1848* (2013.01); *B60L 11/1862* (2013.01); *B60L 2240/622* (2013.01); *B60L 2240/72* (2013.01); *B60L 2250/12* (2013.01); *B60L 2250/16* (2013.01); *Y02T 10/7005* (2013.01); *Y02T 10/705* (2013.01); *Y02T 10/7044* (2013.01); *Y02T 10/7072* (2013.01); *Y02T 10/7291* (2013.01); *Y02T 90/121* (2013.01);
(Continued)

(58) Field of Classification Search
CPC ............. B60L 11/1838; B60L 11/1816; B60L 2240/72; H02J 7/0027; Y02T 10/7088

USPC ..................................... 320/162, 109
See application file for complete search history.

(56) References Cited

U.S. PATENT DOCUMENTS

| | | | |
|---|---|---|---|
| 7,629,772 B2 | 12/2009 | Eberhard et al. | |
| 7,671,567 B2 | 3/2010 | Eberhard et al. | |

(Continued)

FOREIGN PATENT DOCUMENTS

| | | |
|---|---|---|
| JP | 2011-164771 A | 8/2011 |
| JP | 2012-095377 A | 5/2012 |
| KR | 10-2011-0090183 A | 8/2011 |

OTHER PUBLICATIONS

International Search Report, PCT/US2014/037904, Jan. 15, 2015, 8 pages.

(Continued)

*Primary Examiner* — Richard Isla Rodas
*Assistant Examiner* — Manuel Hernandez
(74) *Attorney, Agent, or Firm* — Garlick & Marksion; Bruce E. Garlick

(57) ABSTRACT

A method for automatically charging the battery pack of an electric vehicle in accordance with a set of location sensitive charging instructions is provided. Exemplary location sensitive charging instructions include preset charging schedules and preset charge level limits. Different charging schedules and different charge level limits may be preset for different charging stations and locations, thus allowing the user to preset the charging instructions for each of multiple locations where the user routinely charges their car. Default charging instructions are used at those charging stations and locations where a set of location sensitive charging instructions has not been preset.

20 Claims, 10 Drawing Sheets

(52) U.S. Cl.
CPC .............. *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 30/14* (2013.01)

(56) References Cited

U.S. PATENT DOCUMENTS

| | | |
|---|---|---|
| 7,782,021 B2 | 8/2010 | Kelty et al. |
| 8,054,038 B2 | 11/2011 | Kelty et al. |
| 2009/0313098 A1* | 12/2009 | Hafner .................... B60L 8/003 705/14.1 |
| 2010/0094496 A1* | 4/2010 | Hershkovitz ............. B60L 3/12 701/22 |
| 2012/0056583 A1 | 3/2012 | Gotz |
| 2013/0041850 A1* | 2/2013 | LaFrance ............ B60L 11/1838 705/412 |
| 2013/0054045 A1 | 2/2013 | Ramezani et al. |
| 2013/0175974 A1* | 7/2013 | Bassham ............. B60L 11/1837 320/106 |

OTHER PUBLICATIONS

International preliminary report on patentability in application PCT/US2014/037904, Nov. 24, 2015, 4 pages.

\* cited by examiner

LOCATION BASED CHARGING CONTROL OF ELECTRIC VEHICLE

FIELD OF THE INVENTION

The present invention relates generally to a vehicle charging system and, more particularly, to a control system for enhancing charging system functionality.

BACKGROUND OF THE INVENTION

Electric vehicles present a growing application for rechargeable batteries and, in particular, for large battery packs. Such an application, however, presents a number of engineering challenges to the power system designer, primarily due to the need to balance the expectations of the consumer with the system requirements and the constraints placed on the system by the batteries within the battery pack. Consumer expectations include those associated with the vehicle as a whole, e.g., vehicle range, performance and reliability, and those that are specific to the vehicle's battery system, e.g., battery pack lifetime and replacement cost, as well as the time, cost and convenience associated with charging the vehicle. System requirements include power output, battery pack weight and reliability. Battery constraints include those associated with charging, operational, and storage temperatures; charge rates; the level of allowed/preferred charging (i.e., 75% of full charge, full charge, over-charged, etc.); and the level of discharge allowed before charging.

To address some of the issues associated with batteries, sophisticated charging algorithms may be employed. For example, co-assigned U.S. Pat. No. 8,054,038 discloses a system for controlling the charging system of an electric vehicle, more specifically the charging level, based on a number of parameters. Disclosed parameters include expected travel distance, road conditions, weather conditions, desired battery power safety margins and driving style. Co-assigned U.S. Pat. No. 7,782,021 discloses an alternate charging system controller that determines the optimal time to charge a battery pack based on charging cost, thus taking into account variations in the cost of electricity based on the time of day. Co-assigned U.S. Pat. Nos. 7,671,567 and 7,629,772 disclose alternate charging system controllers that determine the optimal cut-off voltage to be used during charging based on desired vehicle performance and intended usage, driving range and battery life.

While the prior art charging system controllers may take into account a variety of factors in determining optimal charge rates, charge levels, and charging times, these systems provide the user with limited ability to control the charging schedule. As a result, these system controllers do not help the user to minimize the costs associated with charging their vehicle, and therefore do not fully meet consumer expectations with regards to convenience and the potential savings associated with owning an electric vehicle. Accordingly, what is needed is a user interface for a battery pack recharging system that simplifies vehicle charging while helping the user to minimize charging costs. The present invention provides such a use interface and charging system controller.

SUMMARY OF THE INVENTION

A method for charging the battery pack of an electric vehicle using a location based set of charging instructions is provided, the method including the steps of (i) accepting a first set of charging instructions for a first charging station, where the first set of charging instructions is input by a user; (ii) recording the first set of charging instructions in memory; (iii) determining when the electric vehicle is located at the first charging station; (iv) charging the electric vehicle's battery pack in accordance with the first set of charging instructions when the electric vehicle is located at the first charging station; and (v) charging the electric vehicle's battery pack in accordance with a set of default charging instructions when the electric vehicle is located at an alternate charging station to which the first set of charging instructions does not apply. The default charging instructions may, for example, be preset by the vehicle's manufacturer or by the user. The step of accepting the first set of charging instructions may further comprise the steps of positioning the electric vehicle at a location corresponding to the first charging station and identifying the first charging station based on the location, where the identifying step is performed by the controller, where the positioning and identifying steps are performed prior to the accepting step, and where the accepting step is performed while the electric vehicle is positioned at the location. The step of accepting the first set of charging instructions may further comprise the steps of positioning the electric vehicle at a location corresponding to the first charging station, receiving a unique charging station identification (ID) code from the first charging station, and identifying the first charging station based on the unique charging station ID code, where the receiving and identifying steps are performed by the controller, where the positioning, receiving and identifying steps are performed prior to the accepting step, and where the accepting step is performed while the electric vehicle is positioned at the location. The first set of charging instructions may be input by the user using a remote system, e.g., a remote computer, laptop, tablet, smartphone, etc., where the remote charging schedule is then received from the remote system by the controller. The step of determining when the electric vehicle is located at the first charging station may include the steps of positioning the electric vehicle at a location within a preset distance from the first charging station and identifying the first charging station based on the location within the preset distance from the first charging station, where the identifying step is performed by the controller. The preset distance may be input by the user, the vehicle's manufacturer, or a third party. The step of determining when the electric vehicle is located at the first charging station may include the steps of positioning the electric vehicle at a location corresponding to the first charging station, receiving a unique charging station identification (ID) code from the first charging station, and identifying the first charging station based on the unique charging station ID code, where the receiving and identifying steps are performed by the controller.

The method may further include the step of issuing a confirmation query prior to performing the step of charging the battery pack of the electric vehicle in accordance with the default charging instructions when the electric vehicle is located at an alternate charging station, where a first response to the confirmation query results in charging the battery pack in accordance with the default charging instructions, and where a second response to the confirmation query results in performing the additional steps of accepting an alternate set of charging instructions for the alternate charging station, recording the alternate set of charging instructions in the memory and charging the battery pack in accordance with the alternate set of charging instructions when the electric vehicle is located at the alternate charging station.

In at least one embodiment, the first set of charging instructions is comprised of a first charging schedule, where the first charging schedule may be comprised of at least one of a day-of-the-week insensitive charging start time, a day-of-the-week based charging start time, a day-of-the-week insensitive charging end time, and a day-of-the-week based charging end time. The method may further include the steps of (i) accepting a second charging schedule for a second charging station, where the second charging schedule is input by the user; (ii) recording the second charging schedule in memory; (iii) determining when the electric vehicle is located at either the first or second charging station; (iv) charging the electric vehicle's battery pack in accordance with the first charging schedule when the electric vehicle is located at the first charging station; (v) charging the electric vehicle's battery pack in accordance with the second charging schedule when the electric vehicle is located at the second charging station; and (vi) charging the electric vehicle's battery pack in accordance with the default charging instructions when the electric vehicle is located at an alternate charging station. The method may further include the step of issuing a confirmation query prior to performing the step of charging the battery pack of the electric vehicle in accordance with the first set of charging instructions when the electric vehicle is located at the first charging station, where a first response to the confirmation query results in charging the battery pack in accordance with the first set of charging instructions, and where a second response to the confirmation query results in performing the additional steps of over-riding the first set of charging instructions and immediately initiating charging of the battery pack. The step of charging the battery pack of the vehicle in accordance with the first charging schedule when the vehicle is located at the first charging station may further include the steps of (i) determining a current time; (ii) comparing the current time to a scheduled start time of the first charging schedule; (iii) immediately charging the battery pack in accordance with the first charging schedule if the current time is within a preset window of time, where the preset window of time corresponds to the scheduled start time plus a preset time period; and (iv) delaying the charging of the battery pack until the next scheduled start time if the current time is outside of the preset window of time. The delaying step may be over-ridden, thus causing charging to start immediately even when the current time is outside of the preset window of time. The preset time period may, for example, be preset by the vehicle's manufacturer or by the user. The method may further include the steps of (i) accepting a target charge level for the first charging station, where the target charge level is input by the user; (ii) recording the target charge level for the first charging station within the memory; (iii) monitoring a current charge level while performing the step of charging the battery pack in accordance with the first charging schedule; (iv) comparing the current charge level to the target charge level; and (v) terminating the step of charging the battery pack when the current charge level is equal to or greater than the target charge level.

In at least one embodiment, the first set of charging instructions is comprised of a target charge level, and the step of charging the battery pack in accordance with the first set of charging instructions further comprises (i) monitoring a current charge level, (ii) comparing the current charge level to the target charge level, and (iii) terminating the step of charging the battery pack when the current charge level is equal to or greater than the target charge level.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The terms "battery pack" and "battery system" may be used interchangeably and as used herein refer to an electrical energy storage system contained within a single piece or multi-piece housing that is configured to achieve the desired voltage and capacity for a particular vehicle, where the electrical energy storage system utilizes a battery, capacitor or supercapacitor and has the capability to be discharged and recharged. The term "electric vehicle" as used herein refers to either an all-electric vehicle, also referred to as an EV, a plug-in hybrid vehicle, also referred to as a PHEV, or a non-plug-in hybrid vehicle (HEV), a hybrid vehicle utilizing multiple propulsion sources one of which is an electric drive system. It should be understood that identical element symbols used on multiple figures refer to the same component, or components of equal functionality. Additionally, the accompanying figures are only meant to illustrate, not limit, the scope of the invention and should not be considered to be to scale.

Most power companies offer a time-of-use (TOU) program to its users in which the charge rate is based on the time of day and/or the day of the week. By offering incentives, in the form of lower rates, to shift power consumption from peak power periods to off-peak power periods, power companies are able to reduce peak power loads. Many conventional electric vehicles allow the user to setup a charging schedule, either directly via an interface built into the car or indirectly via a smartphone/computer application, so that when they are charging their electric vehicle at home they are able to take advantage of these lower power rates, thereby further increasing the benefits associated with owning an electric vehicle. This approach, however, requires that the user alter or turn-off the charge schedule whenever they wish to charge their vehicle at a charging station located away from their primary charging station, for example when they are trying to charge their car at a public charging station. In contrast, the present invention allows the user to setup different sets of charging instructions, including different charging schedules, for different locations. Then when their vehicle is coupled to a particular charging station, the on-board system automatically determines and implements the preset set of charging instructions based on the vehicle's location.

Figure 1:
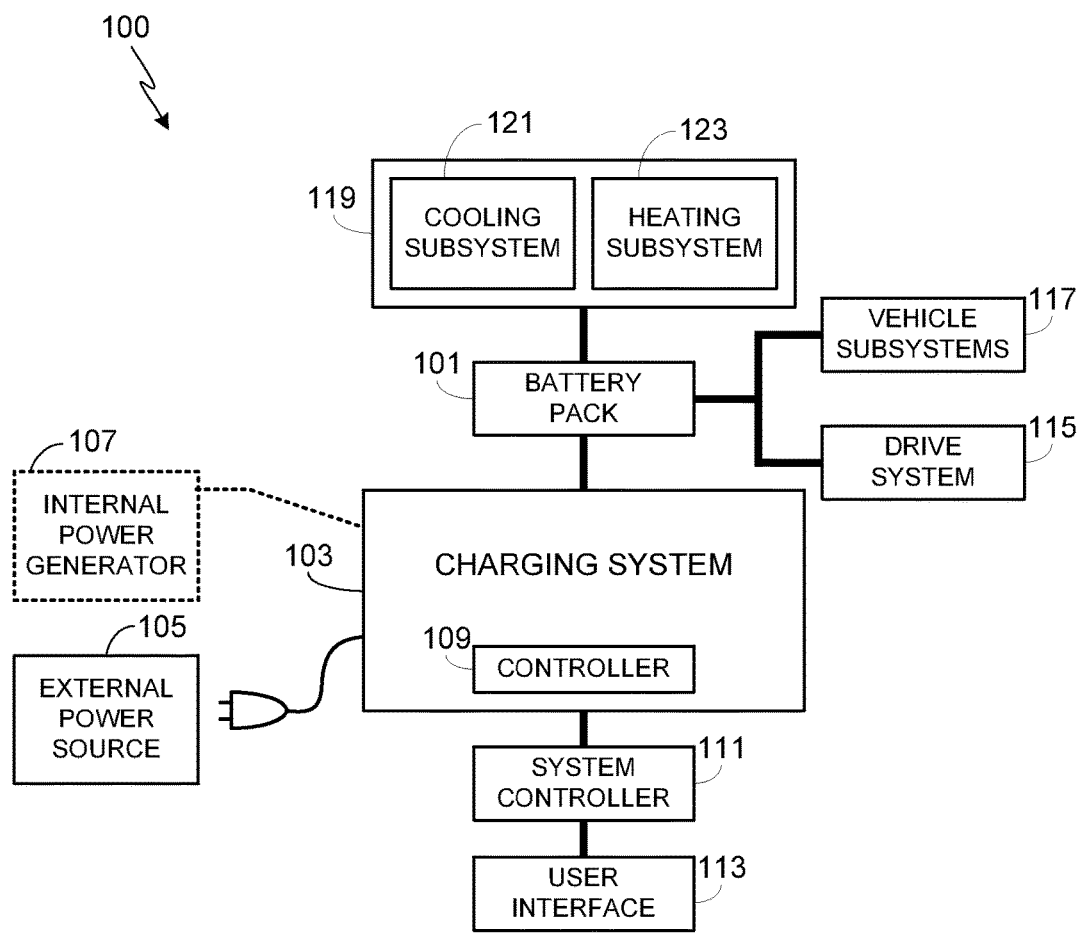
FIG. 1 provides a block diagram of an exemplary charging system that may be used with the present invention.

FIG. 1 provides a block diagram of an exemplary battery charging system 100 that may be used with the present invention. It should be understood that battery charging system 100 is used for illustration purposes only and that the present invention is not limited to a specific charger configuration. For example, the benefits and capabilities associated with the present invention may be attained regardless of the type and size of battery pack, the thermal management system coupled to the battery pack, the location and capabilities of the charger, the drive system and the user interface, all of which may be varied based on the specific requirements and intended use of the vehicle.

In system 100, battery pack 101 is coupled to a charging system 103. Charging system 103 may be integrated within the electric vehicle, integrated within the charging station, or configured as a stand-alone charger that is coupled between the external power source 105 (e.g., the power grid) and the vehicle's battery pack. Note that as its name implies, the external power source 105 is external to the vehicle. As the present invention provides a means for scheduling external charging, it is not applicable to internal power generators 107 such as a regenerative braking system that may be used to at least partially recharge the vehicle's batteries.

During battery pack charging, a controller 109 that is coupled to charger 103 controls operation of the charger, preferably controlling not only its status (on/off), but also its charge rate. Controller 109 may be integrated within, or separate from, charging system 103. As controller 109 typically takes into account a variety of battery parameters in order to determine the appropriate charge rate, etc., parameters such as the state-of-charge (SOC), cut-off voltage, temperature, age and overall capacity of the batteries within pack 101, the functionality associated with controller 109 is often integrated within the vehicle's system controller 111. Alternately, battery pack parameters may be communicated to the controller, for example using a communication link between the controller 109 and the vehicle's system controller 111. A benefit of integrating controller 109 either into the vehicle's charging system 103 or into the vehicle's system controller 111 is that it makes it easier for the vehicle to be charged in a variety of situations with various chargers while still allowing the vehicle's system to determine optimal charge rate, etc. As shown, system controller 111 is coupled to a user interface 113 that provides a means for the user to schedule and control the charging system as described below.

As the present invention provides a means for providing control over a vehicle's charging system, those vehicle systems and components that are unnecessary to the control system's operation may not be described in detail herein. For example, clearly battery pack 101 is coupled to a drive train 115. Drive train 115 may use a single electric motor or multiple electric motors coupled to one or both axles. Similarly, the invention is not limited to a specific type/configuration of transmission (e.g., single speed, multi-speed) or a specific type/configuration of differential (e.g., open, locked or limited slip). Typically battery pack 101 is coupled to the drive motor via a power control system that is used to insure that the power delivered to the motor is of the desired voltage, current, waveform, etc. As such, power control system may be comprised of passive power devices (e.g., transient filtering capacitors and/or inductors), active power devices (e.g., semiconductor and/or electromechanical switching devices, circuit protection devices, etc.), sensing devices (e.g., voltage, current, and/or power flow sensors, etc.), logic control devices, communication devices, etc.

In addition to providing power to the drive motor, battery pack 101 is expected to provide power to any number of auxiliary components requiring electric power, these auxiliary vehicle subsystems and components represented in FIG. 1 by vehicle subsystems 117. Vehicle subsystems 117 may include, but are not limited to, vehicle lights (e.g., driving lights, courtesy lighting, etc.), entertainment systems (e.g., conventional and/or satellite radio, CD player, DVD player, MP3 player, etc.), a navigation system, various vehicle control systems, a user interface, etc. Battery pack 101 may also be coupled to one or more thermal management systems 119 that are used to insure that the batteries, as well as other vehicle components and the passenger cabin, are maintained in their desired temperature range. Typically thermal management system 119 includes both a cooling subsystem 121 and a heating subsystem 123.

Figure 2:
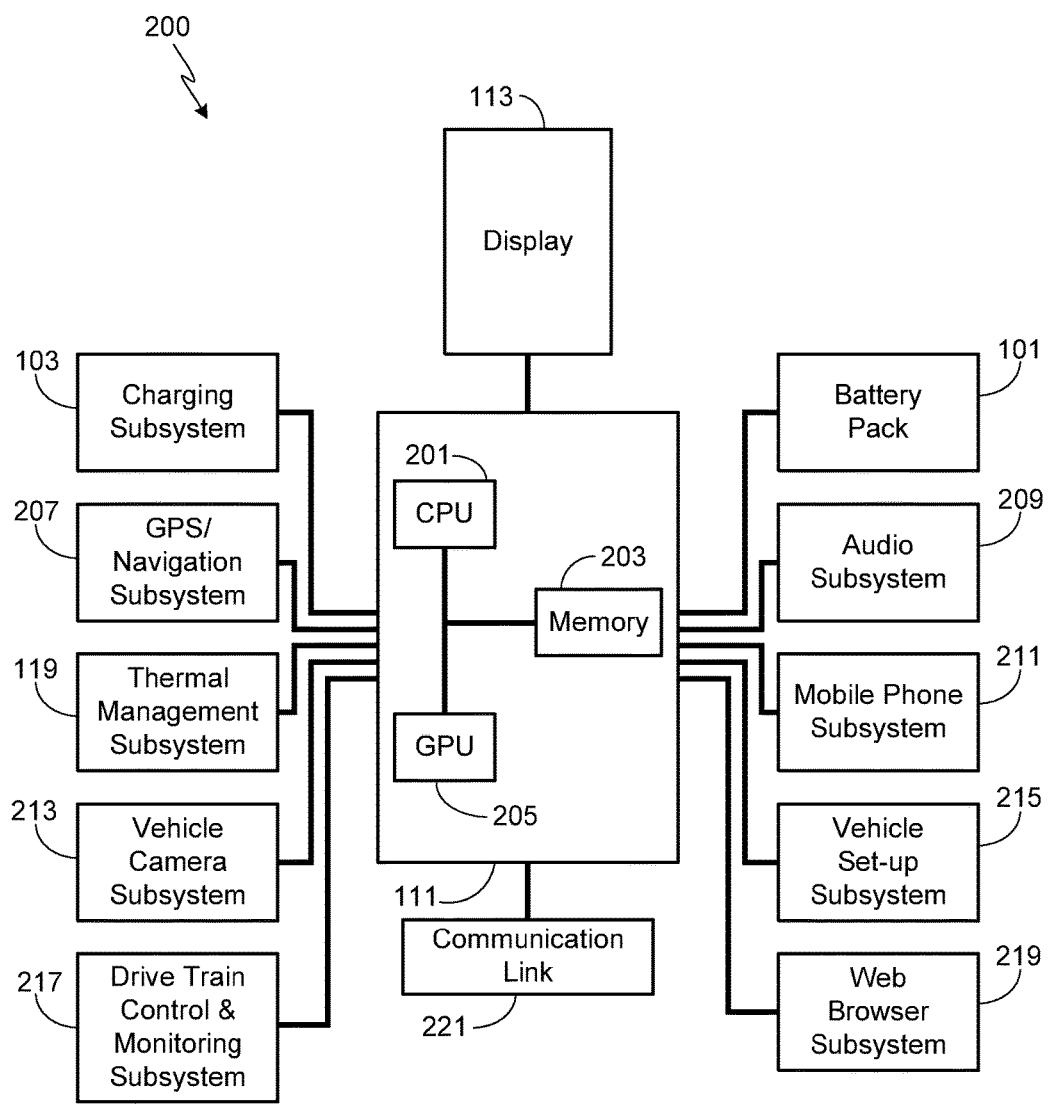
FIG. 2 provides a block diagram of an exemplary interface system that may be used with the present invention.

FIG. 2 provides a block diagram of an exemplary control system 200 suitable for use with the invention. In illustrated system 200, it is assumed that the functionality of controller 109 is embedded within system controller 111 and as such, controller 109 is not shown. As noted above, however, controller 109 may be a separate controller or embedded within charging system 103.

In system 200, system controller 111 includes a central processing unit (CPU) 201 and memory 203. Since user interface 113 is comprised of a touch-screen in the preferred embodiment, preferably system controller 111 also includes a graphical processing unit (GPU) 205. CPU 201 and GPU 205 may be separate or contained on a single chip set. Memory 203 may be comprised of flash memory, a solid state disk drive, a hard disk drive, or any other memory type or combination of memory types. As previously noted, controller 111 is coupled to a variety of charging system components including the charger 103 and the battery pack 101, thus allowing the charging system to be monitored and controlled. In at least one embodiment of the invention, controller 111 is coupled to a global positioning system (GPS) 207, thus allowing the location of the vehicle to be monitored. Although GPS 207 may be a stand-alone system, preferably it is integrated into, and used by, the vehicle's navigation system.

As previously noted, preferably controller 111 is also used to control and monitor a variety of other vehicle subsystems. Exemplary subsystems that may be controlled and monitored by controller 111 include audio subsystem 209, thermal management system 119, mobile phone subsystem 211, vehicle camera subsystem 213, vehicle set-up subsystem 215, drive train control/monitoring subsystem 217, and web browser subsystem 219. Vehicle set-up subsystem 215 allows general vehicle operating conditions to be set such as seat positions, moon roof or sun roof operation, internal lighting, external lighting, windshield wiper operation, etc. Preferably a mobile telecommunications link 221 is also coupled to controller 111, thereby allowing the controller to obtain updates, interface configuration profiles, and other data from an external data source (e.g., manufacturer, dealer, service center, web-based application, remote home-based system, etc.). Mobile telecommunications link 221 may be based on any of a variety of different standards including, but not limited to, GSM EDGE, UMTS, CDMA2000, DECT, and WiMAX.

In the preferred embodiment, user interface 113 is a touch-screen display that provides both a visual aid, for example for use with the navigation screen, and the means to input data and control the various subsystems coupled to controller 111. It should be understood, however, that other types of user interfaces may also be used with the invention.

Figure 3:
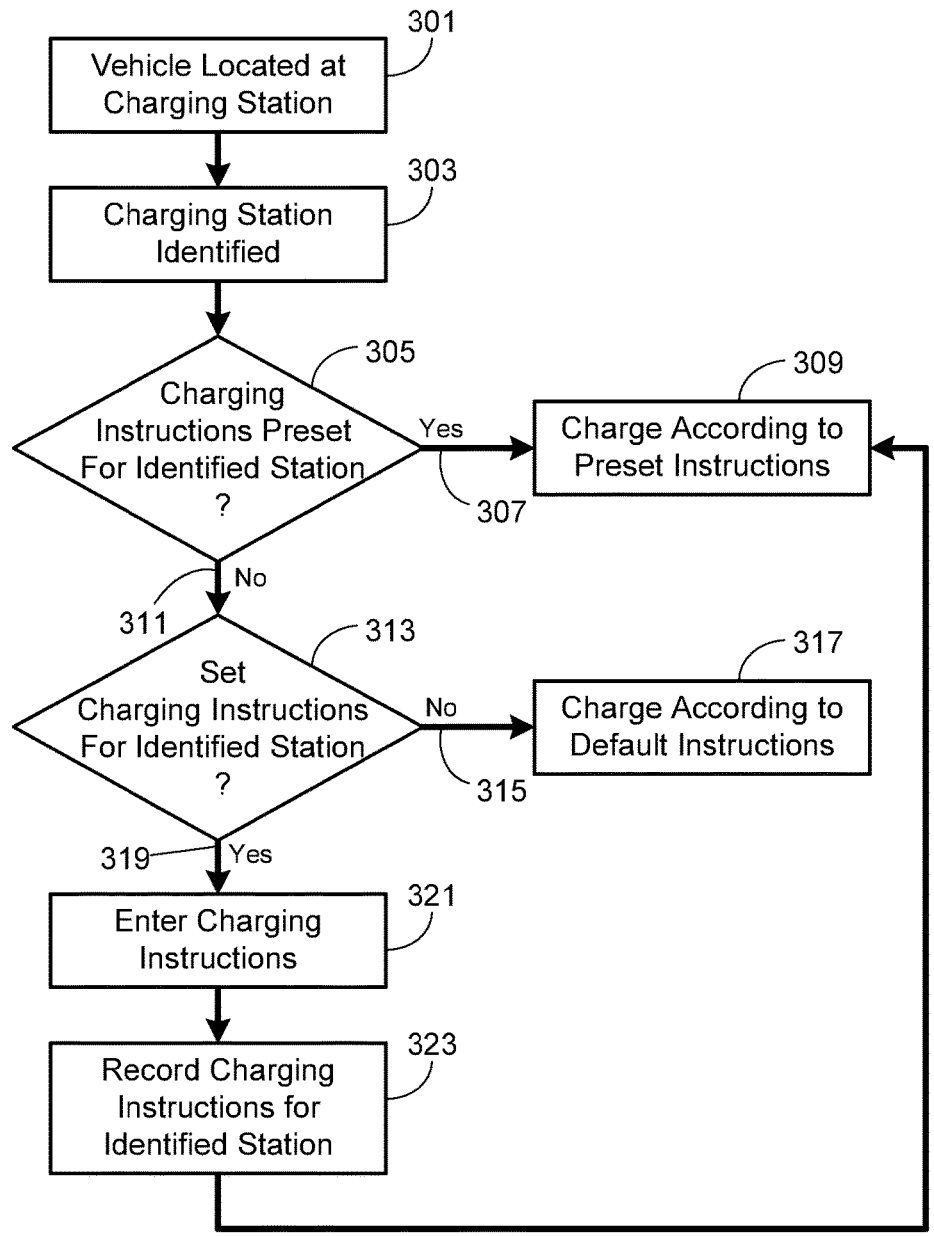
FIG. 3 illustrates the methodology of the invention in accordance with a preferred embodiment.

FIG. 3 illustrates the basic methodology of the invention. This embodiment is configured to charge a vehicle in accordance with a preset set of charging instructions that are location sensitive. Exemplary charging instructions, as described in detail below, may include charging schedules and charge level limits. In at least one preferred embodiment, different charging instructions may be preset for different charging stations/locations, thus allowing the user to preset a charging schedule and/or charge level limit for each of multiple locations where the user routinely charges their car (e.g., home, vacation home, work location, etc.).

Initially the vehicle is located at a charging station (step 301) and an identifier for that particular charging station is determined (step 303). The charging station may be identified based on its location or based on a unique charging station identification code (ID). Although the system may be configured to require that the user inform controller 111 that the vehicle is now located at a charging station, for example by inputting an 'INITIATE CHARGING' command via user interface 113, preferably controller 111 determines that the vehicle is located at a charging station, thereby further automating the system. For example, as on-board GPS 207 provides the coordinates of the vehicle to controller 111, these coordinates can be compared to known charging locations in order to determine if the vehicle is now located at a charging station. Known charging locations may either be preset by the user or acquired from a public list of charging stations. During the step of comparing vehicle coordinates with charging station coordinates, preferably controller 111 does not look for an exact match in coordinates, rather controller 111 determines whether the vehicle is located, based on its coordinates, within a preset distance from a given charging station. Although the preset distance may be preset by the vehicle's manufacturer, dealer, or third party, preferably this distance is input into the system by the end user, thereby allowing the user to adjust the distance surrounding a charging station based on the particulars of the charging station in question. For example, the preset distance surrounding a charging location may be set at a relatively large distance if the charging station in question is within a public or business parking lot where there may be multiple available charging stations located throughout the parking lot. Alternately, the preset distance surrounding a charging location may be set at a relatively small distance if the charging station in question is located at a residence (e.g., vehicle owner's residence or vacation home), thus preventing confusion between adjacent residences.

In some situations, even though the system is configured to use vehicle coordinates to determine location and identity of a charging station, it may not be possible for GPS system 207 to accurately identify the vehicle's current location. This may occur when the vehicle is parked in an underground parking structure or other location where GPS system 207 is unable to receive GPS coordinates. In this situation, preferably controller 111 extrapolates vehicle location based on its last known location, vehicle speed and vehicle direction.

While vehicle coordinates are the preferred approach for identifying a particular charging station, it will be appreciated that other techniques may be used for this purpose. For example, the charging station may include means for transmitting a unique charging station ID. This ID code may be transmitted wirelessly, for example using a radio frequency ID (i.e., RFID). Alternately, the charging station ID code may be transmitted to controller 111 when the vehicle is plugged into the charging station and communication is initiated between the charging station and charging system 103.

In the preferred embodiment whenever the vehicle is parked, controller 111 attempts to identify whether the vehicle has been parked at a charging station and if it has, which charging station. In an alternate embodiment, controller 111 is configured to only attempt to identify the charging station when a preset condition arises. Exemplary preset conditions include opening a charge port door or coupling a charging connector to the vehicle's charger inlet.

Once the vehicle has been parked at a charging station (step 301) and the charging station identified (step 303), controller 111 determines whether or not a set of charging instructions has been preset for the identified charging station (step 305). If a set of charging instructions has been preset (step 307), then charging is performed in accordance with the preset charging instructions (step 309). If a set of charging instructions has not been preset (step 311), then controller 111 communicates a request, preferably via user interface 113, as to whether or not the user wishes to set charging instructions for the identified charging station (step 313). At this juncture, if the user responds that they do not wish to set charging instructions for this location (step 315), then charging is performed in accordance with the default charging instructions (step 317). Typically the default charging instructions immediately initiate battery charging.

If at query 313 the user responds that they wish to set-up a set of charging instructions for the identified charging station (step 319), then the user inputs the requested information (step 321). For example, if the user indicates that they wish to set a charging schedule, then in step 321 they may input a charging start time; alternately, a charging start time based on the day of the week, thus allowing different start times for weekdays and weekends, thereby taking into account different TOU rates for weekdays and weekends; alternately, a charging start time and a charging end time; alternately, both a charging start time and a charging end time based on the day of the week. In step 321, the user may also input a charge level limit, for example a charge level limit based on the state-of-charge (SOC), percentage of battery pack capacity, battery pack energy level, or other charge level qualifier. In step 321, the user may also input both a charge schedule and a charge level limit. Once the user has input a set of charging instructions (step 321), the system controller records the charging instructions in memory 203 for the identified charging station (step 323).

Figure 4:
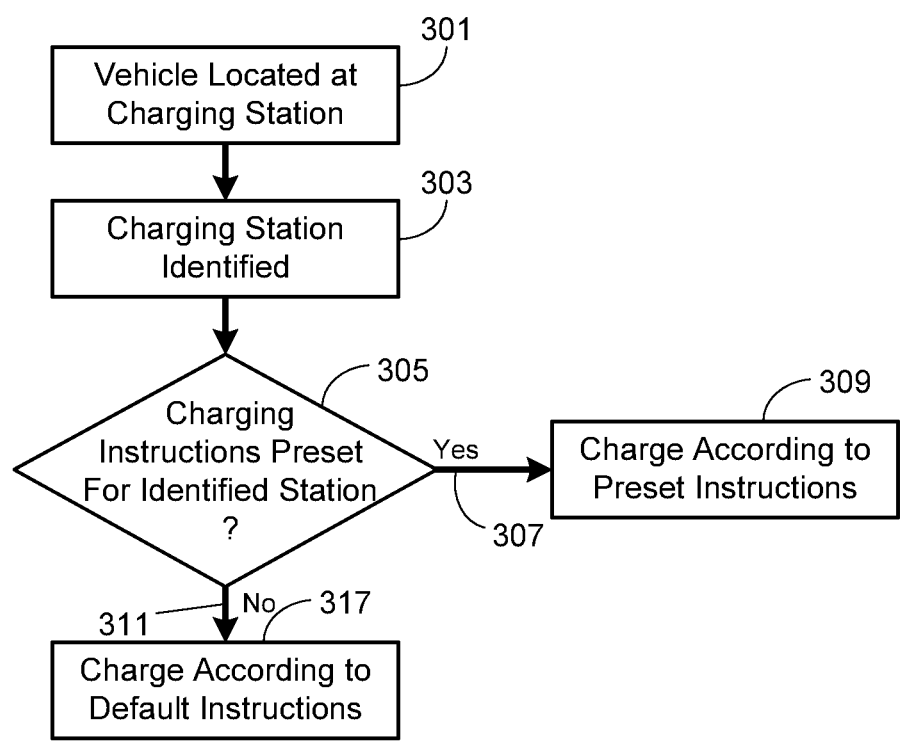
FIG. 4 illustrates a simplified version of the methodology shown in FIG. 3.

FIG. 4 illustrates an alternate methodology, which is based on the methodology shown in FIG. 3, for use with the invention. As illustrated, if a set of charging instructions has not been preset for the charging station (step 311), controller 111 does not issue a query to the user about inputting a set of charging instructions for the current charging station. Rather, according to this procedure controller 111 immediately initiates battery pack charging in accordance with the default charging instructions (step 317) if charging instructions have not been preset for the identified charging station.

Figure 5:
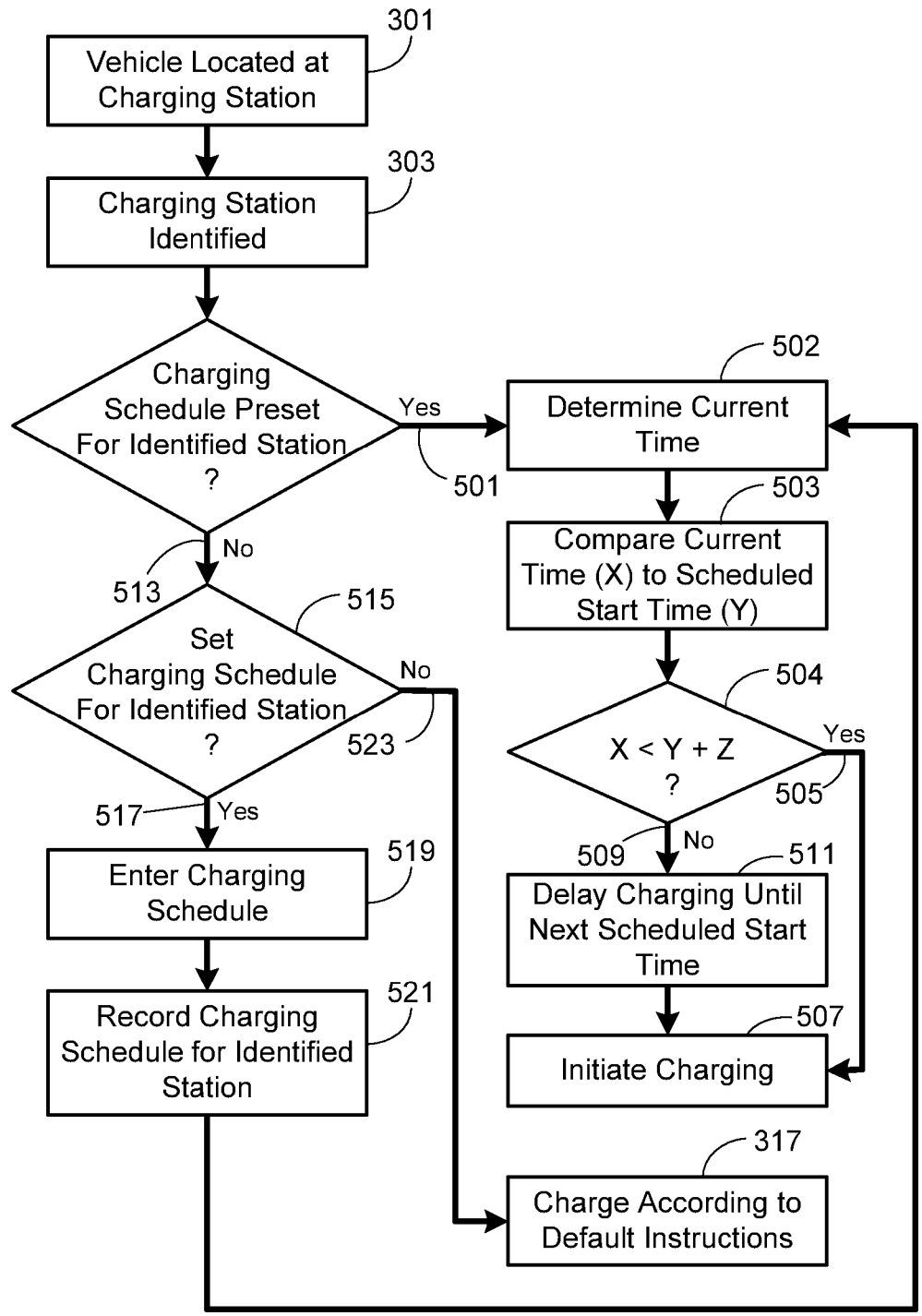
FIG. 5 illustrates a modification of the procedure shown in FIG. 3 in which the set of charging instructions includes a charging schedule.

FIG. 5 provides additional details regarding a preferred embodiment in which the set of charging instructions is comprised of a charging schedule (e.g., charging start time and/or charging end time, which may or may not be based on the day of the week). Although the procedure shown in FIG. 5 is based on that of FIG. 3, it will be appreciated that it is equally applicable to other system configurations such as that shown in FIG. 4.

When a user connects their vehicle to a charging station and the charging station is identified as one in which a charging instructions, i.e., a charging schedule, has been preset (step 501), the first step is for the system to determine the current time (step 502). The current time, X, is then compared to the scheduled start time for charging, Y. (Step 503). If the vehicle is coupled to the charging system within a preset window of time (step 505), the charging is initiated immediately (step 507). If the time in which the vehicle is coupled to the charging system falls outside of the preset window of time (step 509), then charging is delayed (step 511) until the next scheduled start time at which point charging is initiated (step 507).

In step 504 controller 111 determines if the current time, i.e., the time X at which point the vehicle is coupled to the charging station, falls within the preset period of time, i.e., Y+Z where Y is the scheduled start time and Z defines the size of the window. In at least one embodiment, Z is set at 6 hours. Z, the window size, may be preset by the vehicle's manufacturer or a dealer or other third party. In at least one embodiment, the system is configured to allow the user to set this time. Assuming Z is set at 6 hours, and assuming a scheduled start time (Y) of 10 PM, if the user plugs in the vehicle at 11:30 PM, the outcome of step 504 is to initiate charging (step 507) since 11:30 PM falls within the window of 10 PM plus six hours. Given the same window and scheduled start time, if the user plugs in the vehicle at 4:30 AM, the controller would delay charging (step 511) until the following evening at 10 PM.

In the procedure shown in FIG. 5, as in the procedure shown in FIG. 3, if charging instructions, i.e., a charging schedule, have not been set for the identified charging station (step 513), then the system queries the user as to whether or not they wish to input a charging schedule (step 515). If the user responds affirmatively (step 517), then the user inputs the desired charging schedule (step 519) which, in turn, is recorded in memory for that particular charging station (step 521). If, on the other hand, the user responds to the query in step 515 in the negative (step 523), then charging is performed in accordance with the default charging instructions (step 317), for example by immediately initiating battery charging.

As previously described, the present invention allows a user to preset charging instructions for a specific charging station so that each time that the vehicle charges at that particular charging station the preset charging instructions are used. By inputting a charging schedule for the charging instructions, the user is able to optimize charging, for example by utilizing preferred TOU rates at regularly visited charging stations (e.g., home, vacation home, work). The inventors of the present invention have found that in addition to presetting the charging schedule for an identified charging station, providing the user with the ability to set a target charge level limit, at which point charging is terminated, is a useful variant of the present invention. For example, this variant allows the user to set different charge level limits based on driving expectations that may be based, at least in part, on the location of the charging station. For example, the user may set a first, lower, target charge limit for their home charging station while setting a second, higher, target charge limit at a charging station located at their vacation home with the expectation that a larger driving range is required at their vacation home.

Figure 6:
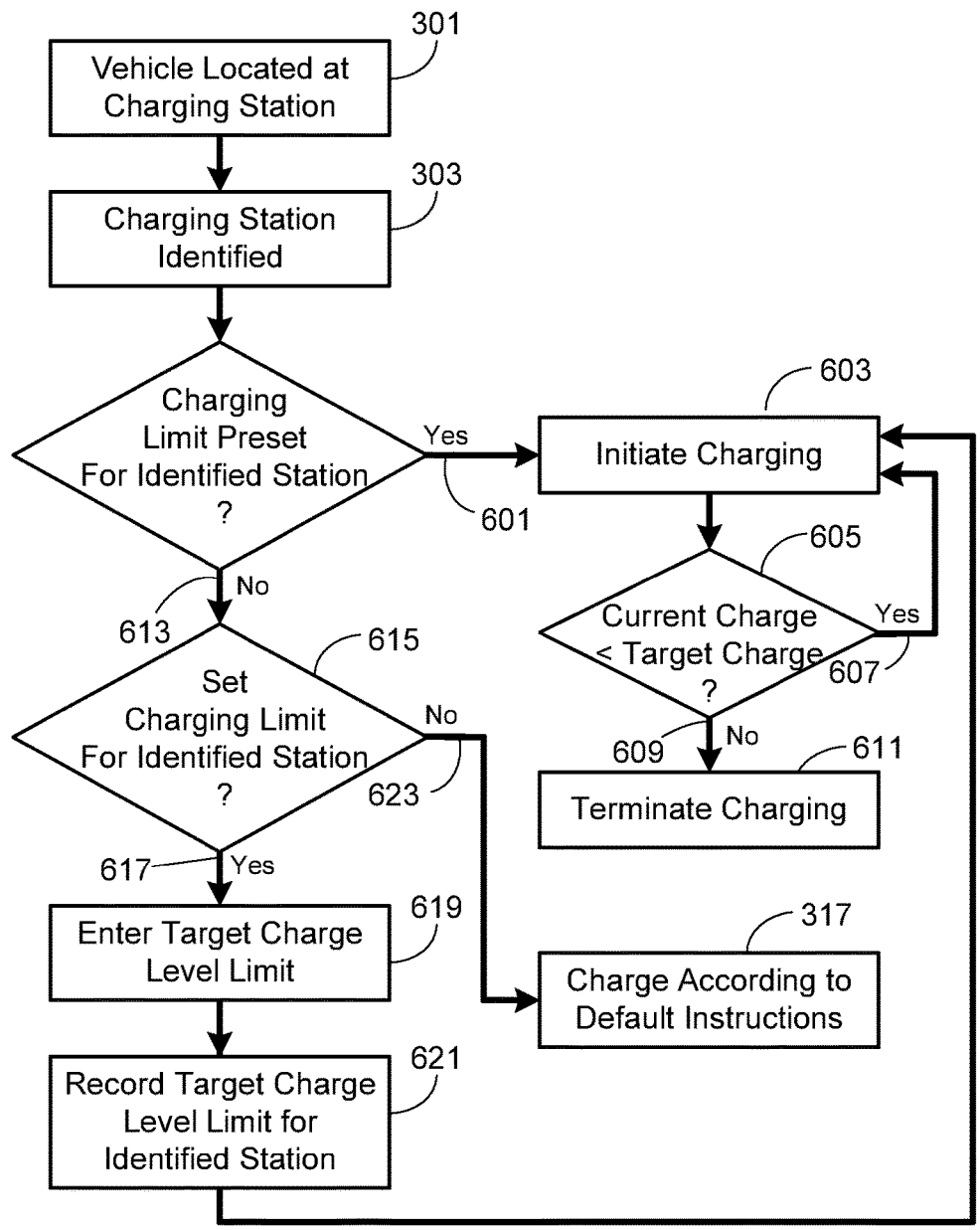
FIG. 6 illustrates a modification of the procedure shown in FIG. 3 in which the set of charging instructions includes a target charge level limit.

FIG. 6 provides additional details regarding a preferred embodiment in which the set of charging instructions is comprised of a target charge level limit. Although the procedure shown in FIG. 6 is based on that of FIG. 3, it will be appreciated that it is equally applicable to other system configurations such as that shown in FIG. 4. It should be understood that the target charge level may be given in terms of state-of-charge (SOC), percentage of battery pack capacity, battery pack energy level, or other charge level qualifier.

In this configuration, when a user connects their vehicle to a charging station and the charging station is identified as one in which charging instructions, i.e., a target charge level limit, has been preset (step 601), after charging is initiated (step 603) the controller continually compares the current charge level to the preset target charge level (step 605). As long as the current charge level is less than the preset target charge level, charging continues (step 607). Once the target charge level is reached (step 609), charging is terminated (step 611).

As in the procedures shown in FIGS. 3 and 5, if charging instructions, i.e., a target charge level limit, has not been set for the identified charging station (step 613), then the system queries the user as to whether or not they wish to input charging instructions, i.e., a target charge level limit (step 615). If the user responds affirmatively (step 617), then the user inputs the desired target charge level limit (step 919) which, in turn, is recorded in memory for that particular charging station (step 621). If, on the other hand, the user responds to the query in step 615 in the negative (step 623), then charging is performed in accordance with the default charging instructions (step 317), for example by immediately initiating battery charging and applying a default charge level limit.

Figure 7:
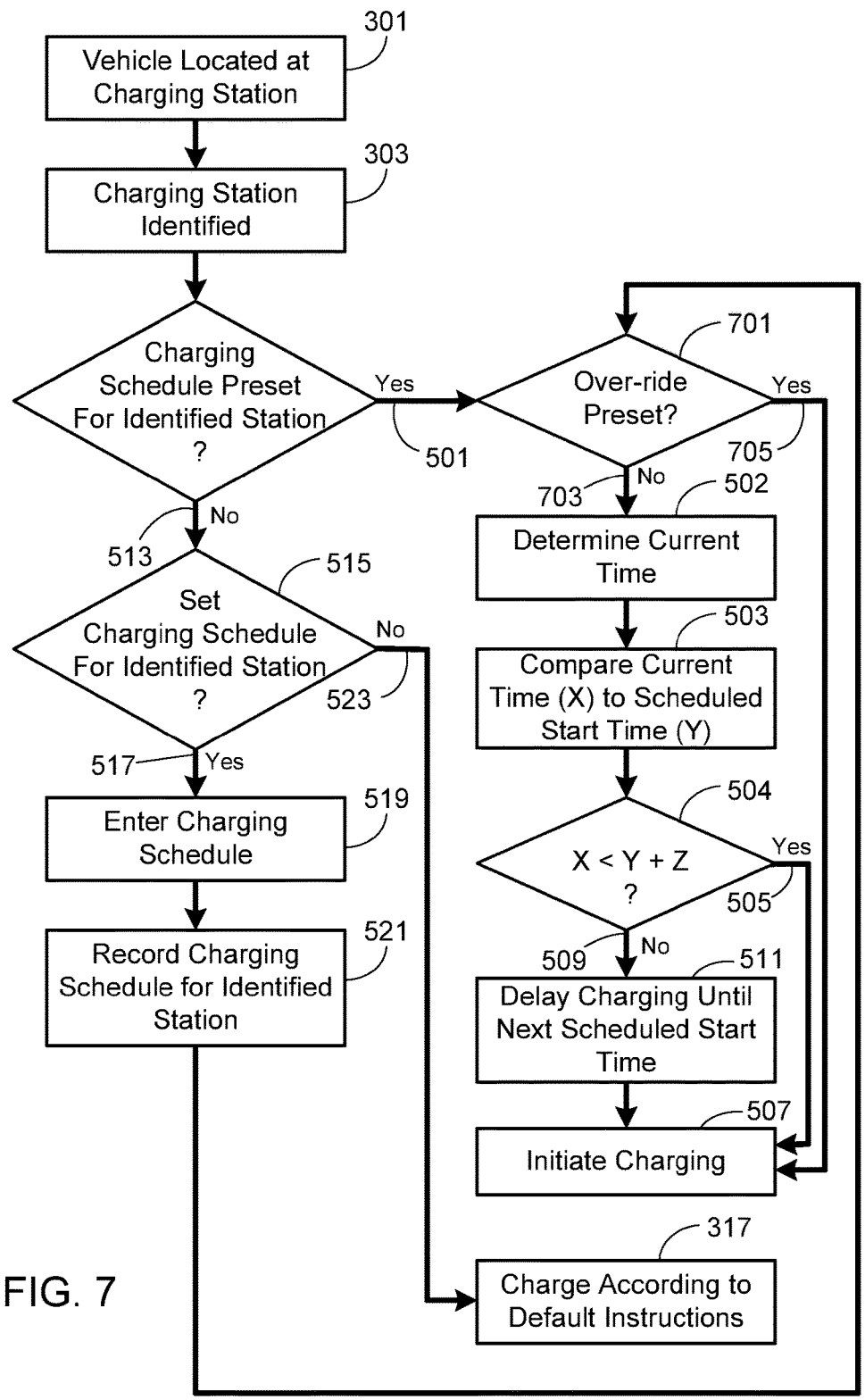
FIG. 7 illustrates a modification of the procedure shown in FIG. 5 that provides a simple means for over-riding the preset charging instructions.

In at least one embodiment, when the user attempts to charge their car at a charging station with a preset set of charging instructions, the user is given the option to over-ride the preset set of charging instructions. For example, FIG. 7 illustrates a modification of the procedure shown in FIG. 5 to allow the user to over-ride the preset, a particularly useful feature when the user plugs their car into the charging station after the preset window has closed, but still requires charging before the next day's travel. For example, in the scenario described above relative to FIG. 5, when the user plugged their car in at 4:30 AM this feature would allow the user to quickly over-ride delay step 511. In this embodiment, controller 111 queries the user, for example via user interface 113, to determine whether or not to over-ride the preset schedule. (Step 701). Preferably the query is designed to default to following the preset charging instructions unless the user proactively requests that charging begin immediately. In an exemplary configuration utilizing a touch-screen user interface, when interface 113 displays the charging screen that provides charging information (e.g., present battery pack state-of-charge (SOC) or percent charged, charging station capabilities, remaining time left before target SOC is achieved, etc.), a question is displayed on the screen that queries "OVER-RIDE CHARGING SCHEDULE?". If the user does nothing, or presses a "NO" soft-button (step 703), then controller determines whether or not to immediately initiate charging or delay charging until the next schedule start time following the procedure outlined above. Alternately, if the user presses a "YES" soft-button (step 705), or otherwise indicates (e.g., using a hard button) that charging should start, then charging is immediately initiated (step 507).

Figure 8:
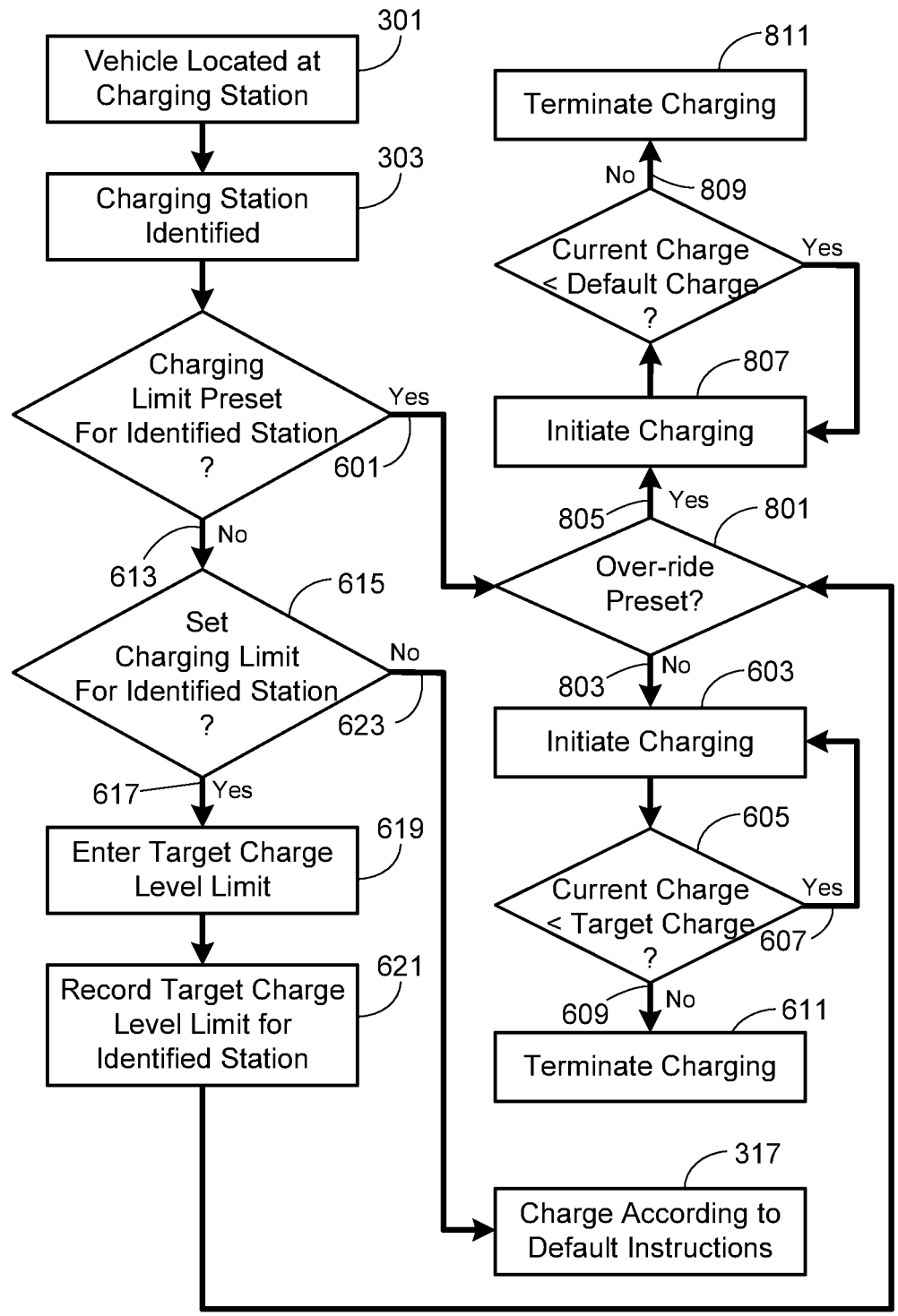
FIG. 8 illustrates a modification of the procedure shown in FIG. 6 that provides a simple means for over-riding the preset charging instructions.

Similarly, the over-ride feature may be employed in configurations in which a target charge level limit is preset, such as that described above relative to FIG. 6. The use of the over-ride feature in such a configuration is illustrated in FIG. 8. In this exemplary embodiment, controller 111 queries the user to determine whether or not to over-ride the preset charge limit. (Step 801). As previously described, preferably the query is designed to default to following the preset charging instructions. In response to the query, if the user does nothing, or presses a "NO" soft-button (step 803), then the system charges the battery pack to the preset target charge level limit at which point charging is terminated (step 611). If the user presses a "YES" soft-button (step 805), or otherwise indicates (e.g., using a hard button) that the preset charging instructions should be over-ridden, then charging is immediately initiated (step 807). Charging continues until the current charge level reaches the default charge level (step 809), at which point charging is terminated (step 811). The default and/or target charge level limit may be preset by the vehicle manufacturer, battery pack manufacturer, user or other party and configured to maximize battery pack health or longevity or to achieve a particular performance goal, e.g., maximizing vehicle range, vehicle performance, battery health, etc.

Figure 9:
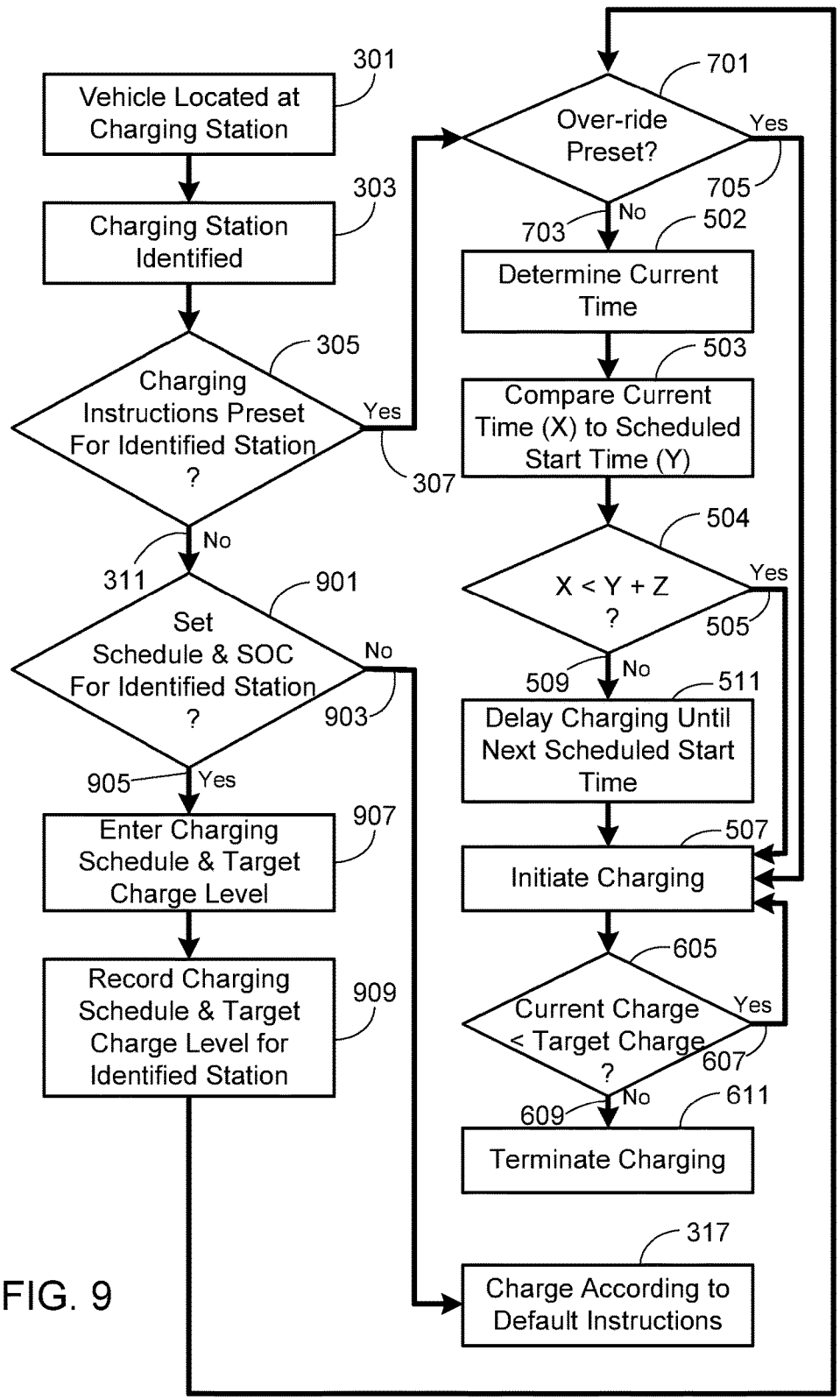
FIG. 9 illustrates a configuration in which the set of charging instructions includes a charging schedule and a target charge level limit.

It should be understood that the preset charging instructions may include both a charging schedule and a target charge level limit as illustrated in the exemplary embodiment shown in FIG. 9. In this embodiment, if controller 111 determines that charging instructions have not been preset for the identified charging station (step 311), then controller 111 determines whether or not the user wishes to set a charging schedule and target charge level for the identified charging station (step 901). At this juncture, if the user responds that they do not wish to set a charging schedule for this location (step 903), then charging is performed in accordance with the default charging instructions (step 317). If the user wishes to set a charging instructions for the identified charging station (step 905), then they enter a target charge level in addition to the desired charging schedule (step 907), both of which are recorded in memory (step 909).

Although not required, in the illustrated embodiment when the user is at an identified charging station in which charging instructions have been preset (step 307), they are given the option (step 701) to over-ride the preset charging schedule (step 705) and immediately initiate charging (step 507). If the user indicates that they do not wish to over-ride the presets (step 703), then the system determines the current time (step 502) and compares the current time to the scheduled start time (step 503). In response, controller 111 either immediately initiates charging (step 507) or delays charging until the next scheduled start time (step 511). Once charging is initiated (step 507), the controller continually compares the current charge level to the preset target charge level (step 605). As long as the current charge level is less than the preset target charge level, charging continues (step 607). Once the target charge level is reached (step 609), charging is terminated (step 611).

Figure 10:
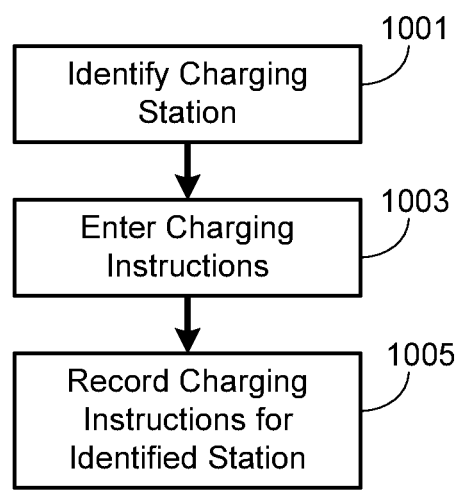
FIG. 10 illustrates an alternate procedure for inputting charging instructions that corresponds to a particular charging station.

Typically, and as described above, charging instructions are input for a particular charging station when the vehicle is located at that charging station. It should be understood, however, that the present invention can utilize charging instructions that are input into the vehicle's controller utilizing other techniques, and even when the vehicle is not located at the affected charging station. As illustrated in FIG. 10, in such an embodiment the user initially identifies the charging station in question (step 1001). The charging station may be identified from a list of charging stations, from a map, based on map coordinates that correspond to the charging station, or via other means, and may utilize the vehicle's user interface or a computer, laptop, tablet, smart phone, etc. If a system that is external to the vehicle is used to identify and configure the charging instructions, this information may be downloaded to the on-board control system via communication link 221 or via a flash-drive or similar portable memory. Once a particular charging station has been identified, the user inputs the charging instructions for that particular station (step 1003). As noted above, the system may be configured to accept various information for the preset schedule and/or the target charge limit. Once the user has input the desired charging instructions (step 1003), the system controller records in memory 203 the charging instructions for the identified charging station (step 1005). After charging instructions have been input into the system and recorded, each time the vehicle arrives at the identified charging station, the system performs the preset instructions, unless over-ridden, as described above in FIGS. 3-9.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method of charging a battery pack of an electric vehicle, the method comprising:

accepting a first set of charging instructions for a first charging station, wherein said first set of charging instructions is input by a user and said accepting step is performed by a controller of an on-board vehicle control system;

recording said first set of charging instructions for said first charging station in a memory;

determining when said electric vehicle is located at said first charging station, wherein said determining step is performed by said controller; and in response to the determination, charging said battery pack of said electric vehicle in accordance with said first set of charging instructions;

determining when said electric vehicle is located at an alternate charging station; and when said electric vehicle is located at said alternate charging station to which the first set of charging instructions does not apply:

issuing a confirmation query prior to performing charging of said battery pack of said electric vehicle in accordance with a set of default charging instructions;

wherein receipt by said controller of a first response to said confirmation query results in performing charging of said battery pack of said electric vehicle in accordance with the set of default charging instructions; and wherein receipt by said controller of a second response to said confirmation query results in performing the steps of accepting an alternate set of charging instructions, recording said alternate set of charging instructions for said alternate charging station in said memory, and charging said battery pack of said electric vehicle in accordance with said alternate set of charging instructions.

2. The method of claim 1, wherein said step of accepting said first set of charging instructions further comprises the steps of positioning said electric vehicle at a location corresponding to said first charging station and identifying said first charging station based on said location, wherein said identifying step is performed by said controller, wherein said positioning and identifying steps are performed prior to said accepting step, and wherein said accepting step is performed while said electric vehicle is positioned at said location.

3. The method of claim 1, wherein said step of accepting said first set of charging instructions further comprises the steps of positioning said electric vehicle at a location corresponding to said first charging station, receiving a unique charging station identification (ID) code from said first charging station, and identifying said first charging station based on said unique charging station ID code, wherein said receiving and identifying steps are performed by said controller, wherein said positioning, receiving and identifying steps are performed prior to said accepting step, and wherein said accepting step is performed while said electric vehicle is positioned at said location.

4. The method of claim 1, wherein said first set of charging instructions is input by said user on a remote system separate from said electric vehicle, wherein said accepting step further comprises the step of receiving said first charging schedule from said remote system by said controller.

5. The method of claim 1, wherein said step of determining when said electric vehicle is located at said first charging station further comprises the steps of positioning said electric vehicle at a location within a preset distance from said first charging station and identifying said first charging station based on said location within said preset distance from said first charging station, wherein said identifying step is performed by said controller.

6. The method of claim 5, further comprising the steps of accepting said preset distance and recording said preset distance in said memory, wherein said preset distance is input by said user and said steps of accepting and recording said preset distance are performed by said controller.

7. The method of claim 5, further comprising the steps of accepting said preset distance and recording said preset distance in said memory, wherein said preset distance is input by a vehicle manufacturer and said steps of accepting and recording said preset distance are performed by said controller.

8. The method of claim 1, wherein said step of determining when said electric vehicle is located at said first charging station further comprises the steps of positioning said electric vehicle at a location corresponding to said first charging station, receiving a unique charging station identification (ID) code from said first charging station, and identifying said first charging station based on said unique charging station ID code, wherein said receiving and identifying steps are performed by said controller.

9. The method of claim 1, wherein said set of default charging instructions is preset by a vehicle manufacturer of said electric vehicle.

10. The method of claim 1, wherein said set of default charging instructions is preset by said user.

11. The method of claim 1, wherein said first set of charging instructions is comprised of a first charging schedule.

12. The method of claim 11, wherein said first charging schedule is comprised of at least one of a day-of-the-week insensitive charging start time, a day-of-the-week based charging start time, a day-of-the-week insensitive charging end time, and a day-of-the-week based charging end time.

13. The method of claim 11, said method further comprising the step of issuing a confirmation query prior to performing said step of charging said battery pack of said electric vehicle in accordance with said first set of charging instructions, wherein receipt by said controller of a first response to said confirmation query results in performing said step of charging said battery pack of said electric vehicle in accordance with said first set of charging instructions, and wherein receipt by said controller of a second response to said confirmation query results in performing the steps of over-riding said first set of charging instructions and immediately initiating charging of said battery pack of said electric vehicle.

14. The method of claim 11, wherein said set of default charging instructions requires charging of said battery pack to be immediately initiated after said battery pack is electrically coupled to said alternate charging station.

15. The method of claim 1, wherein said first set of charging instructions is comprised of a target charge level, and wherein said step of charging said battery pack of said electric vehicle in accordance with said first set of charging instructions further comprises:
monitoring a current charge level;
comparing said current charge level to said target charge level; and
terminating said step of charging said battery pack of said electric vehicle in accordance with said first set of charging instructions when said current charge level is equal to or greater than said target charge level.

16. A method for charging a battery pack of an electric vehicle, the method comprising:
accepting a first set of charging instructions including a first charging schedule for a first charging station, wherein the first set of charging instructions is input by a user and the accepting step is performed by a controller of an on-board vehicle control system;
recording the first set of charging instructions for the first charging station in a memory;
determining when the electric vehicle is located at the first charging station; and
in response to the determination, charging the battery pack of the electric vehicle in accordance with the first set of charging instructions by:
determining a current time;
comparing the current time to a scheduled start time of the first charging schedule;
immediately charging the battery pack of the electric vehicle in accordance with the first charging schedule if the current time is within a preset window of time that corresponds to the scheduled start time plus a preset time period; and delaying charging the battery pack of the electric vehicle in accordance with the first charging schedule until the scheduled start time if the current time is outside of the preset window of time, wherein the battery pack of the electric vehicle is charged in accordance with a set of default charging instructions when the electric vehicle is located at an alternate charging station to which the first set of charging instructions does not apply.

17. The method of claim 16, wherein the preset time period is set by a vehicle manufacturer of the electric vehicle.

18. The method of claim 16, further comprising accepting the preset time period and recording the preset time period in the memory, wherein the preset time period is input by the user, and wherein accepting the preset time period is performed by the controller.

19. The method of claim 16, the method further comprising issuing a confirmation query prior to delaying charging the battery pack, wherein receipt by the controller of a first response to the confirmation query results in delaying charging the battery pack, and wherein receipt by the controller of a second response to the confirmation query results in over-riding the delaying of charging the battery pack and immediately initiating charging of the battery pack of the electric vehicle.

20. The method of claim 16, further comprising:

accepting a target charge level for the first charging station, wherein the target charge level is input by the user and accepting the target charge level is performed by the controller;

recording the target charge level for the first charging station in the memory;

monitoring a current charge level while charging the battery pack of the electric vehicle in accordance with the first charging schedule;

comparing the current charge level to the target charge level; and terminating charging of the battery pack of the electric vehicle in accordance with the first charging schedule when the current charge level is equal to or greater than the target charge level.

* * * * *